June 7, 1966   G. M. THOMSON ET AL   3,254,538
GAS PRESSURE OPERATED RATE GYROSCOPE
Filed April 20, 1962   6 Sheets-Sheet 1

INVENTORS
GEORGE M. THOMSON
JAMES S. MALCOLM
BY Herbert L. Davis
ATTORNEY

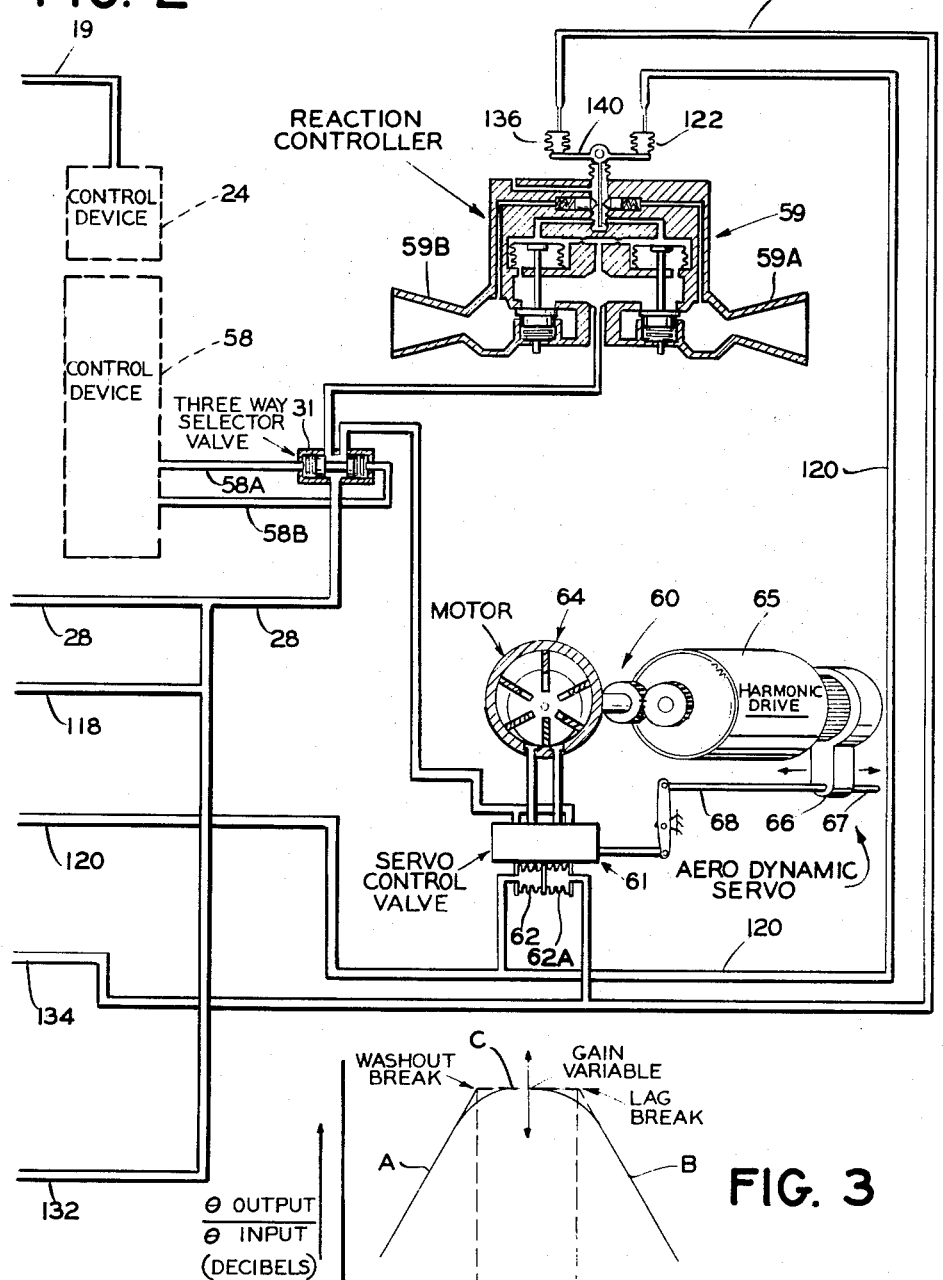

June 7, 1966   G. M. THOMSON ETAL   3,254,538
GAS PRESSURE OPERATED RATE GYROSCOPE
Filed April 20, 1962   6 Sheets-Sheet 3

INVENTORS
GEORGE M. THOMSON
JAMES S. MALCOLM
BY *Herbert L. Davis*
ATTORNEY

INVENTORS
GEORGE M. THOMSON
JAMES S. MALCOLM
BY Herbert L. Davis
ATTORNEY

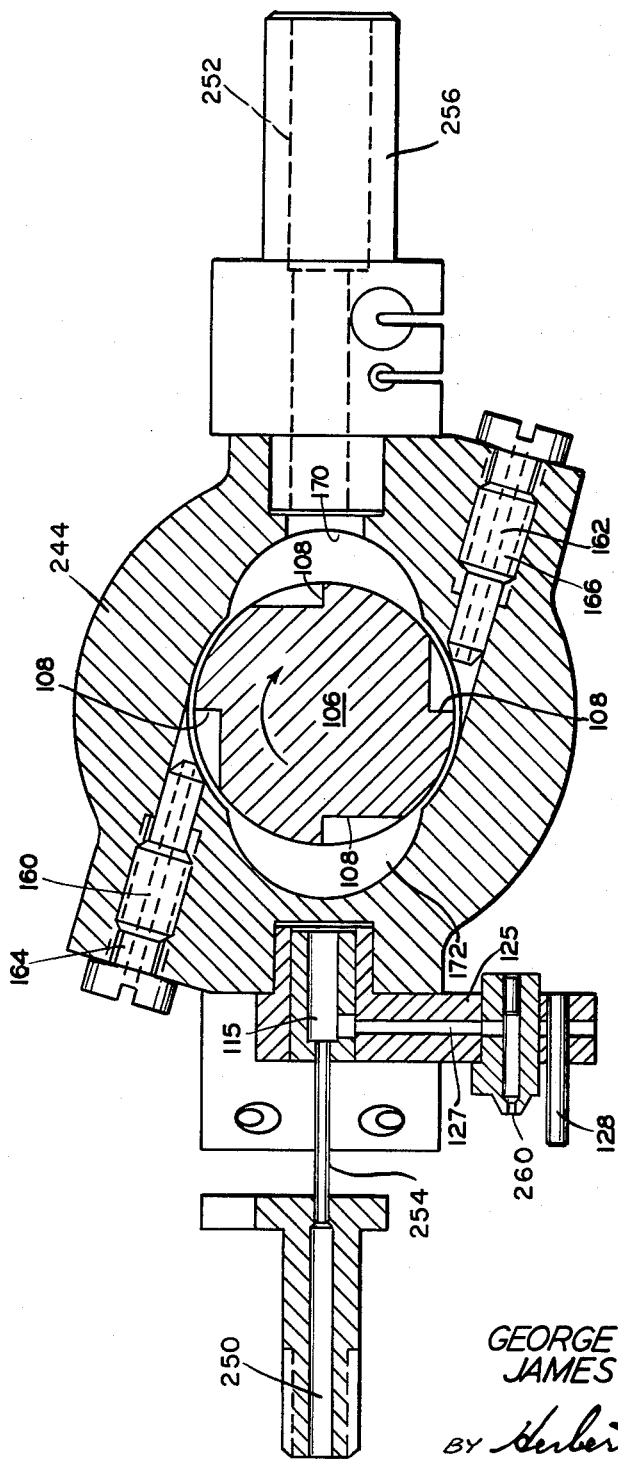

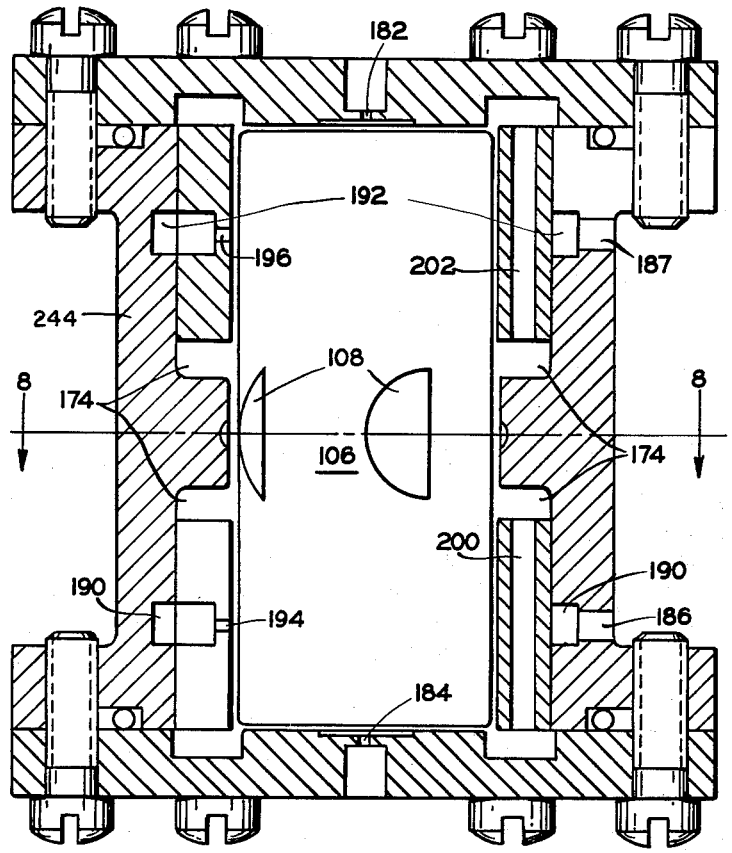
FIG. 7
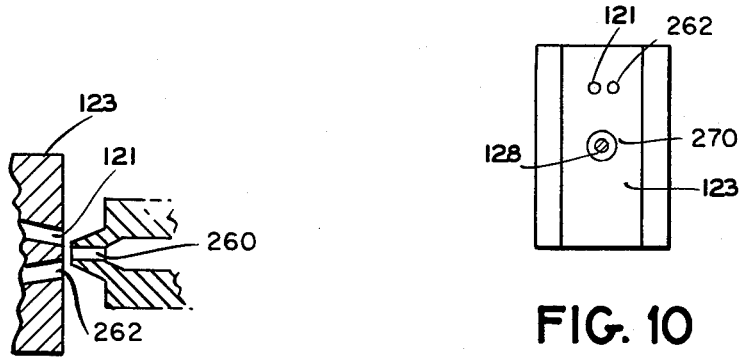
FIG. 9
FIG. 10
INVENTORS
GEORGE M. THOMSON
JAMES S. MALCOLM
BY Herbert L. Davis
ATTORNEY United States Patent Office 3,254,538
Patented June 7, 1966

3,254,538
GAS PRESSURE OPERATED RATE GYROSCOPE
George M. Thomson, Wayne, and James S. Malcolm, Bloomingdale, N.J., assignors to The Bendix Corporation, Teterboro, N.J., a corporation of Delaware
Filed Apr. 20, 1962, Ser. No. 189,144
13 Claims. (Cl. 74—5.7)

The present invention relates to a fluid pressure operated rate gyroscope, and more particularly to a cold or hot gas pressure operated rate gyroscope energized solely by a pressurized gas and including signal generating means operated thereby and utilizing the pressurized gas to provide the controlling signal in a pressurized gas control system for an aircraft or outer space vehicle.

In the present invention, the energizing and signal medium utilized may be a pressurized cold gas such as bottled air under high pressure or hydrogen gas under high pressure or a hot gas such as hydrozine or the decomposition products of ninety percent (90%) hydrogen peroxide which may be supplied at 1340° F. and 600 p.s.i. to the rate gyroscope and signal generating means for use in a pressurized gas flight stabilization system applicable to aircraft and outer space vehicles.

Such fluid pressure operated systems, utilizing hot and cold gases, find increasing application in the control of missiles and spacecraft. Extensive studies in hot gas controls have led to the development of techniques that provide unprecedented degrees of mission reliability in aerodynamic surface actuation, space orientation and stabilization, power generation and utilization, and conversion devices.

Hot gas controls by the very nature of the fluid media employed are unaffected by environment; however, the materials of which hot gas devices are constructed pose their greatest limitation. These limitations are overcome through the use of all facets of gas technology—high temperature materials; fuels compatible with auto-oxidation to avoid the limitations of conventional lubricants, the use of gas expansion principles to allow survival of conventional lubricants, and finally a thermal balance between mission environment, duration and material heat sink properties.

Power application techniques involve multiple-power conversions, with attendant complexity and inefficiency. Hot gas provides a method whereby the energy released by fuel or propellant is used in a single conversion to provide horsepower. The equipment, with the exception of the fuel itself, requires no cooling or shielding, thereby making the general techniques independent of complex artificial environments.

The system's simplicity, reliability, and flexibility offer the vehicle manufacturer broad attitudes of application. Some of the many possibilities of the system are as follows:

(1) Combining controls with an accessory power unit,
(2) Selecting fuels capable of multiple functions, as hydrogen-oxygen (breathing, electrical power, control power, main propulsion cooling—as examples).

Additional flexibility is gained by utilizing main engine propellants or main engine gas products.

Also worthy of consideraion in evaluating gas controls are:

(1) The elimination of return lines (as compared to hydraulics),
(2) A dry system,
(3) A high degree of storability,
(4) A single power source for atmospheric and space control.

Although hot gas represents a means of providing control actuation and space-attitude control, work is in progress to expand the sphere to other flight-control functions. The concepts under development and designs already available will provide a total control capability, with each individual system combination utilizing the best that the entire control field has to offer.

An object of the invention is to provide a novel fluid pressure operated gyroscope energized solely by pressurized gases such as utilized in flight stabilization systems of aircraft and outer space vehicles subject to high temperature environments.

Another object of the invention is to provide a novel pressurized gas energized rate gyroscope utilizing the energizing gases to provide differential control signals for effectively controlling components of a flight stabilization system of an aircraft or outer space vehicle.

Another object of the invention is to provide a novel rate gyroscope in which energizing gas may be utilized for driving the rotor of the gyroscope and may be supplied to the gyroscope rotor casing and discharged from the gyroscope through hollow torsion tubes which also serve as a gimbal suspension and resilient restraint for the casing of the gyro rotor.

Another object of the invention is to provide a novel rate gyroscope having a gas driven turbine rotor suspended in gas bearings and in which the gyroscope rotor may be housed in a casing suspended by a pair of hollow tubes through which the gas may be supplied to the rate gyroscope and exhausted from the turbine and gas bearings and in which at least one of the hollow tubes provides a torsion restraint for the casing of the gyroscope rotor.

Another object of the invention is to provide a novel rate gyroscope having a gas driven rotor supplied with an energizing gaseous medium from the exhaust of a jet pipe pickoff sensing gimbal motion of the casing of the gyroscope rotor relative to an outer casing of the gyroscope to effect a control function.

Another object of the invention is to provide a novel rate gyroscope of the aforenoted gas driven type in which a supply of the gaseous medium under pressure is applied to the jet pipe pickoff through a hollow torsion tube which also serves as a gimbal suspension and restraint for the casing of the gyroscope rotor.

Another object of the invention is to provide a novel rate gyroscope including a gyroscope rotor of the aforenoted gas driven type and in which the gas energizing fluid is exhausted through a hollow torsion tube which also provides a gimbal suspension and restraint for a casing of the gyroscope rotor.

Another object of the invention is to provide a novel hot gas pressure operated rate gyroscope capable of operating at ambient temperatures of 1500° F. or better and also operative in nuclear environments in which such energizing hot gas fluid mediums are relatively unaffected by such environments.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 2 is a diagrammatic view of a second part of the hot gas flight stabilization system of FIGURE 1.

FIGURE 3 is a magnitude ratio diagram illustrating graphically the relationship between the input frequency of the controlling signal and the output gain effected by the control mechanism of FIGURE 1 in the low frequency, intermediate frequency and high frequency signal operating ranges.

FIGURE 7 is an enlarged sectional view of the rotor case and turbine of FIGURE 5 taken along the lines 7—7 thereof and looking in the direction of the arrows.

FIGURE 8 is a sectional view of the rotor case and turbine taken along the lines 8—8 of FIGURE 7 and looking in the direction of the arrows.

FIGURE 9 is an enlarged fragmentary sectional view of the control jet pipe nozzle, jet pipe receiver orifices and control block taken along the line 9—9 of FIGURE 5 and looking in the direction of the arrows.

FIGURE 10 is a fragmentary end view of the control block taken along the line 10—10 of FIGURE 5 and looking in the direction of the arrow and showing the jet pipe receiver orifices and stop pin in operative relation.

Figure 1:
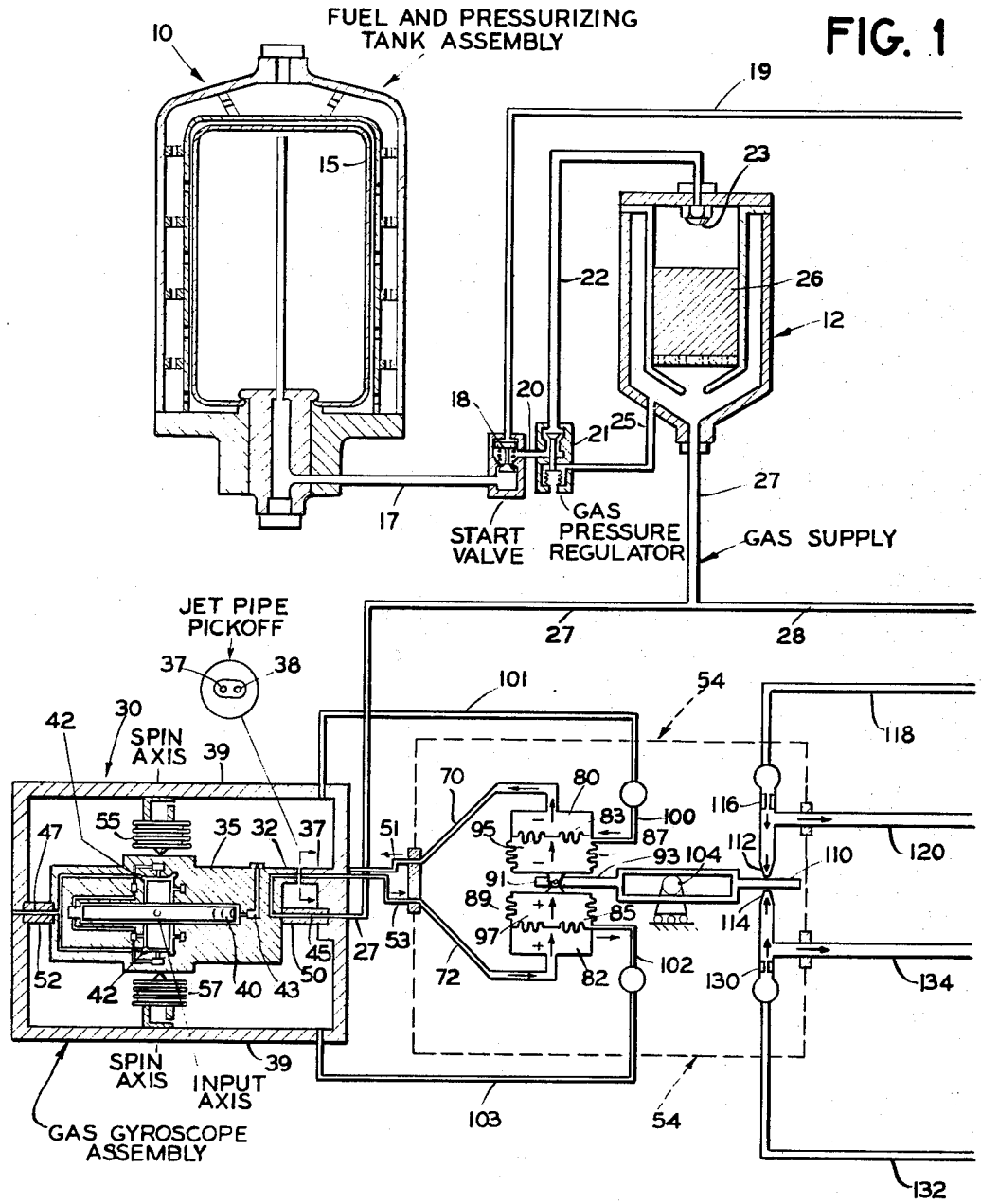
FIGURE 1 is a diagrammatic view of a part of a hot gas flight stabilization system in which there is shown in operative relation one form of hot gas driven rate gyroscope embodying the subject matter of the invention.

Referring to the drawings of FIGURES 1 and 2, there is shown a hot gas stabilization system including a fuel tank or container 10 in which the fuel pressure may be allowed to decay during the duty cycle, but in which the generated gas pressure may be maintained at a constant level of, for example, 600± p.s.i.g. by metering the flow of liquid fuel to a gas generator and accumulator assembly indicated by the numeral 12.

The fuel tank 10 may be of a conventional type including an expulsion bladder 15 containing a suitable fuel such as hydrogen peroxide. The tank 10 may be pressurized by a suitable gas such as nitrogen gas to an initial pressure of 1,800 p.s.i.g. The liquid hydrogen peroxide contained in the bladder 15 may then be applied under the pressure of the nitrogen gas in the container 10 to an output line 17 controlled by a start valve 18 operated through a control conduit 19. Upon the start valve 18 being opened, the liquid hydrogen peroxide under the pressure of the nitrogen gas will then flow through a conduit 20 and a gas pressure regulator (peroxide metering valve) indicated by the numeral 21 to a conduit 22 leading to the inlet 23 of the gas generator 12.

The start valve 18 may operate in response to an external command signal or fluid pressure applied through the conduit 19 from an outside source or suitable control device 24. The gas pressure regulator 21 will control the amount of hydrogen peroxide flowing through conduit 22 into the gas generator 12 in response to the controlling gas outlet pressure from the gas generator and accumulator assembly 12 applied through a conduit 25.

The liquid hydrogen peroxide applied to the gas generator 12 may be decomposed in a silver screen catalyst bed 26 into oxygen and superheated steam having a temperature of approximately 1400° F. The decomposed hydrogen peroxide then flows through an output gas supply line or conduit 27 from the generator and accumulator assembly 12 to a rate gyroscope indicated generally by the numeral 30 and through an output line 28 to a three-way selector valve 31, as hereinafter explained.

The output line 27 connected to the rate gyroscope 30 opens at a control jet pipe nozzle 32 attached to a gimbal provided by a rotor housing 35 of the rate gyroscope 30 and operatively positioned in relation to two (2) jet pipe receiver orifices 37 and 38 projecting from an interior surface of a sealed casing 39 of the rate gyroscope 30.

The jet pipe nozzle 32 and receiver orifices 37 and 38 may be of a conventional type such as shown, for example, by U.S. Patent No. 2,345,169, granted March 28, 1944, to G. Wunsch et al.

*Hot gas rate gyroscope*

The gyroscope assembly 30 is an all gas pressure operated rate gyroscope which may operate under extremely high temperature conditions without any energy source other than the supply gas. Hot gas flight stabilization systems of the aforenoted type are applicable to any type of vehicle including space vehicles subject to high temperature operating environments.

The gyroscope assembly 30 may include a turbine driven gyroscope rotor wheel 40 which rotates on gas bearings 42, as shown in FIGURE 1, and which may be mounted in the housing 35. The housing 35 has an inlet passage or connection 45 and an outlet passage or connection 47 extending through torsion tubes 50 and 52, which tubes act as the spring restraint for the rotor housing or enclosure 35 and may be of conventional type. (An alternate design may utilize one hollow torsion tube and one hollow pivot suspended on a gas bearing, as in the form of the invention illustrated by FIGURES 4 and 5.) The gimbal motion of the rotor housing 35 is indicated by the jet pipe nozzle 32 projecting from the housing 35 and the position thereof relative to two (2) jet pipe receiver orifices 37 and 38 projecting from the interior surface of the casing 39. Gimbal motion of the rotor housing 35 is damped by two (2) opposing bellows-orifice combinations 55 and 57. The entire mechanism is contained in the sealed casing 39 with inlet connection 45 and exhaust connection 47 for the energizing gas and output signal conduits 51 and 53 leading from the jet pipe receiver orifices 37 and 38, respectively, to a compensated control mechanism 54.

The control mechanism 54 may be of a type disclosed in greater detail and claimed in a copending U.S. application Serial No. 186,252 filed April 9, 1962, now Patent No. 3,180,592 by Edward Jeye, Robert Bosworth, Ben C. Nichols, and Raymond Kaczyinski and assigned to The Bendix Corporation.

In the operation of the hot gas rate gyroscope 30, shown in FIGURE 1, hydrogen peroxide gas, under pressure and applied through conduit 27 and inlet passage 45 in torsion tube 50 is applied through the jet pipe nozzle 32 projecing from the rotor housing 35. Any motion of housing 35 is detected by means of the differential pressure effected between the two jet pipe receiver orifices 37 and 38 by the adjusted position of the jet pipe nozzle 32 in relation thereto. The gas is then accumulated under pressure in the sealed casing 39 and directed into the turbine or gyroscope rotor wheel 40 and gas bearings 42 through a passage 43 so as to rotate the gyroscope rotor wheel 40 and provide the gas bearings 42 on which the rotor wheel 40 is suspended.

The rotation of the gyroscope rotor wheel 40 effects an angular momentum about the spin axis of the gyroscope rotor wheel 40 which, in turn, creates a gyroscopic torque about the output axis when an angular velocity is applied about the input axis. This torque produces gimbal motion about the output axis which is restrained by the torsion tube or tubes 50 and 52 and is indicated by the adjusted position of the jet pipe nozzle 32 relative to the receiver orifices 37 and 38, as previously described.

Undesirable oscillatory motions of the gimbal or rotor housing 35 are damped by two (2) opposing bellows-orifice combinations 55 and 57 acting between the gimbal or rotor housing 35 and the casing 39. This is accomplished by one of the bellows for example 55 compressing a volume of the gas and exhaling it through an orifice while the other bellows, for example 57, expands a volume of gas and inhales it through an orifice. Each of the bellows 55 and 57 alternately expands and compresses the gas in one complete cycle.

The three-way valve 31, as shown in FIGURE 2, may be operable by a command or fluid pressure signal from a suitable control device 58 applied through conduits 58A and 58B so as to selectively render operative a jet reaction controller indicated generally by the numeral 59 or an aerodynamic servo indicated generally by the numeral 60. Thus, the operation of the three-way valve 31 may select the mechanism to be effective in controlling the aircraft or outer space vehicle by applying a flow of controlling hot gas so as to operate the appropriate controller 59 or 60.

The gas driven rate gyroscope 30, as heretofore explained, includes the rotor 40 which spins on gas bearings 42 at extremely high rates of speed of, for example, 120,000 r.p.m. so as to provide a necessary flight orientation (single axis) signal to the compensated control mechanism 54. The control mechanism 54 includes, as hereinafter explained, a flapper servo valve amplifier and a filter arrangement which may filter or "wash out" the low frequency steady-state rate signals associated with a turn maneuver of the aircraft or outer space vehicle.

The output of the compensated control mechanism 54 provides a differential pressure output signal which is applied so as to control the reaction controller 59 and the aerodynamic servo 60, as hereinafter explained.

The jet reaction controller 59 may include an automatic proportional type of gas metered thrust chamber and two opposed nozzles 59A and 59B so arranged that each chamber may produce a thrust of, for example, one hundred pounds. The aerodynamic surface controller 60 may include a servo valve 61 of a four-way proportional type having a weight flow rate proportional to the input with a constant supply pressure and controlled by differential pressure output signals from the control mechanism 54 applied to control bellows 62 and 62A. The output of this valve 61 is applied to a rotary expansion vane type motor 64 which drives a mechanical transmission 65. This transmission 65 is mechanically connected by an arm 66 and linkage 67 to the aerodynamic control surfaces, not shown, of the aircraft or outer space vehicle and leading from the arm 67 is a position feedback linkage 68 to reposition the valve 61 with changes in the position of the arm 67 and the aerodynamic control surfaces operatively positioned thereby.

*Control mechanism*

As shown schematically in FIGURE 1, the output conduits 51 and 53 lead from the jet pipe receiver orifices 37 and 38, respectively, to input lines 70 and 72 of the control mechanism 54 which are in turn connected to dead-ended chambers 80 and 82 of identical structure and having rigid walls except for walls defined by flexible diaphragms 83 and 85, respectively.

The diaphragms 83 and 85 separate the dead-ended chambers 80 and 82 from the interior of flexible bellows 87 and 89 arranged in balanced relation and operatively connected at 91 to lever arm 93.

The bellows 87 and 89 provide interiorly thereof variable volumes 95 and 97, respectively, and opening into the interiors of the bellows 87 and 89, are capillary tubes 100 and 102 leading to and from the interior of the sealed casing 39 of the gyro 30 so as to connect to the interior of the bellows 87 and 89 a substantially constant pressure source of hot gaseous fluid pressure medium applied through conduits 101 and 103 connected to the interior of the sealed casing 39 of the gyroscope 30.

As shown schematically in FIGURE 1, the lever arm 93 of the control mechanism 54 is pivotally mounted on a fulcrum 104 which may be adjustably positioned in a suitable manner by the operator to provide various selected mechanical advantages. The lever arm 93 is adjustably positioned about the fulcrum 104 so as to control the position of a flapper valve 110 relative to suitable fluid pressure valve orifices 112 and 114 to cause a pressure change to occur in the chamber between the valve orifice 112 and a restricted orifice 116 leading through a conduit 118 to the source of fluid pressure medium applied through conduit 28. The change in the differential pressure applied in the chamber between the valve orifice 112 and the restricted orifice 116 is in turn applied through a conduit or output line 120 to a suitable bellows 122 to effect a control function, as shown diagrammatically in the system of FIGURE 1.

The adjustment of the flapper valve 110 relative to the valve orifice 112 will affect in an opposite sense the valve orifice 114 to cause in turn a pressure change in an opposite sense in the chamber between the valve orifice 114 and a restricted orifice 130 leading through conduit 132 to the source of fluid pressure medium applied through conduit 28. The change in the differential pressure applied in the chamber between the valve orifice 114 and the restricted orifice 130 is in turn applied through a conduit or output line 134 to a suitable bellows 136 so as to act with the bellows 122 to control the position of a pivotal control arm 140 to effectively control the jet reaction controller 59. Similarly the differential pressure signals applied through the output lines 120 and 134 of the control mechanism 54 are effective to control the differential control bellows 62 and 62A of the servo valve 61 of the aerodynamic servo 60 for positioning aerodynamic surfaces of the aircraft or outer space vehicle as well as the jet reaction controller 59 for controlling the attitude of the aircraft or outer space vehicle.

In the operation of the control mechanism 54, upon a differential pressure signal being applied through output conduits 51 and 53 of the rate gyroscope 30 by the displacement of the position of the jet pipe nozzle 32 relative to the receiver orifices 37 and 38, this differential pressure signal will cause a change in the volume of chambers 80 and 82 due to the resulting deflection in opposite senses of diaphragms 83 and 85. The resulting displacement of the diaphragms 83 and 85 will in turn then cause a change in the volumes 95 and 97 of the bellows 87 and 89, respectively, which in turn will act through the fluid gaseous medium within the bellows 87 and 89 to effect a displacement of the bellows 87 and 89 in opposite senses and a resulting displacement thereby of the lever arm 93 to cause in turn the flapper valve 110 to be so adjusted relative to the valve orifices 112 and 114 as to effect through the flapper valve controlled system an adjustment of the control arm 140 of the reaction controller 59 and the servo control valve 61 of the aerodynamic servo 60 to provide the desired control function.

The respective changes in opposite senses in the pressure of the fluid medium in the volumes 95 and 97 will also cause a restricted flow of fluid medium through the capillary tube 100 in one sense and a restricted flow of fluid medium through the capillary tube 102 in an opposite sense until a steady-state condition has been effected. The resulting adjustment of the lever arm 93 and flapper valve 110 will in turn cause a differential pressure change in the flapper system and differential pressure signal applied to the output lines 120 and 134 to control suitable mechanism on the aircraft or outer space vehicle such as the aerodynamic servo 60 or gas reaction controller 59 for controlling the flight attitude of the aircraft or vehicle in outer space.

*Operation*

In the operation of the system of FIGURES 1 and 2, it will be seen that the control mechanism 54 includes a fluid pressure operated network and signal amplification means, which when utilized in the fluid pressure operated flight stabilization system of FIGURES 1 and 2 will perform two required system functions; to wit, the mechanism 54 will filter or "wash out" steady-state rate signals associated with a flight turn maneuver of an aircraft or outer space vehicle (low frequency signals) as indicated graphically in FIGURE 3 by the line A and attenuate rate signals arising from structural coupling of the body of the aircraft or outer space vehicle with the rate gyroscope 30

(high frequency signals) as indicated graphically in FIGURE 3 by the line B, while providing high gain output signals in response to input signals applied over a normal intermediate operating range (intermediate frequency signals) as indicated graphically in FIGURE 3 by the line C.

The frictional resistance of the input lines 70 and 72, as well as the capillary lines 100 and 102, together with the flexibility of the diaphragms 83 and 85 and bellows 87 and 89 and the compressibility of the fluid medium in the volumes 95 and 97 under the pressure of the fluid medium applied through the capillary lines 100 and 102 and subject to the changing pressure of the fluid medium applied to the diaphragms 83 and 85 in response to an input signal is such that upon a change in the input signal at the relatively low frequency indicated graphically by the line A of FIGURE 3, the leakage afforded by the capillary tubes 100 and 102 to the changing pressure in the volumes 95 and 97 is such as to tend to "wash out" or retard the transfer of the low frequency signals to the lever arm 93. Thus, such low frequency signals have little or no controlling effect on the flapper system so that steady-state rate signals associated with a flight turn maneuver of the aircraft or outer space vehicle or low frequency signals due to poor gyroscope nulls may be effectively eliminated, filtered or washed out.

Moreover higher frequency signals indicated graphically by the lines C and B of FIGURE 3 are not filtered or "washed out" by the action of the capillary lines 100 and 102, but instead such higher frequency signals are transferred through the diaphragms 83 and 85, pressure medium in the volumes 95 and 97 and bellows 87 and 89 to the lever arm 93.

Furthermore, such signals within the intermediate frequency range indicated graphically by the line C of FIGURE 3 are amplified by the flapper system so as to provide high gain output control signals, while such higher frequency signals coming within the high frequency range indicated graphically by the line B of FIGURE 3 are effectively attenuated. In effecting the latter attenuation, the area of the flapper valve 110 in cooperative relation with the valve orifices 112 and 114 and the frictional resistance of the lines 120 and 134 together with the volume of the controlled bellows 122 and 136 is such that the response thereof to the rapidly changing input signal progressively decreases with an increase in the frequency of such high frequency signals over the range indicated graphically by the line B of FIGURE 3, so as to thereby effectively attenuate and eliminate those extremely high frequency rate signals arising from structural coupling of the body of the aircraft or outer space vehicle.

*Second form of gas pressure operated rate gyroscope*

Figure 4:
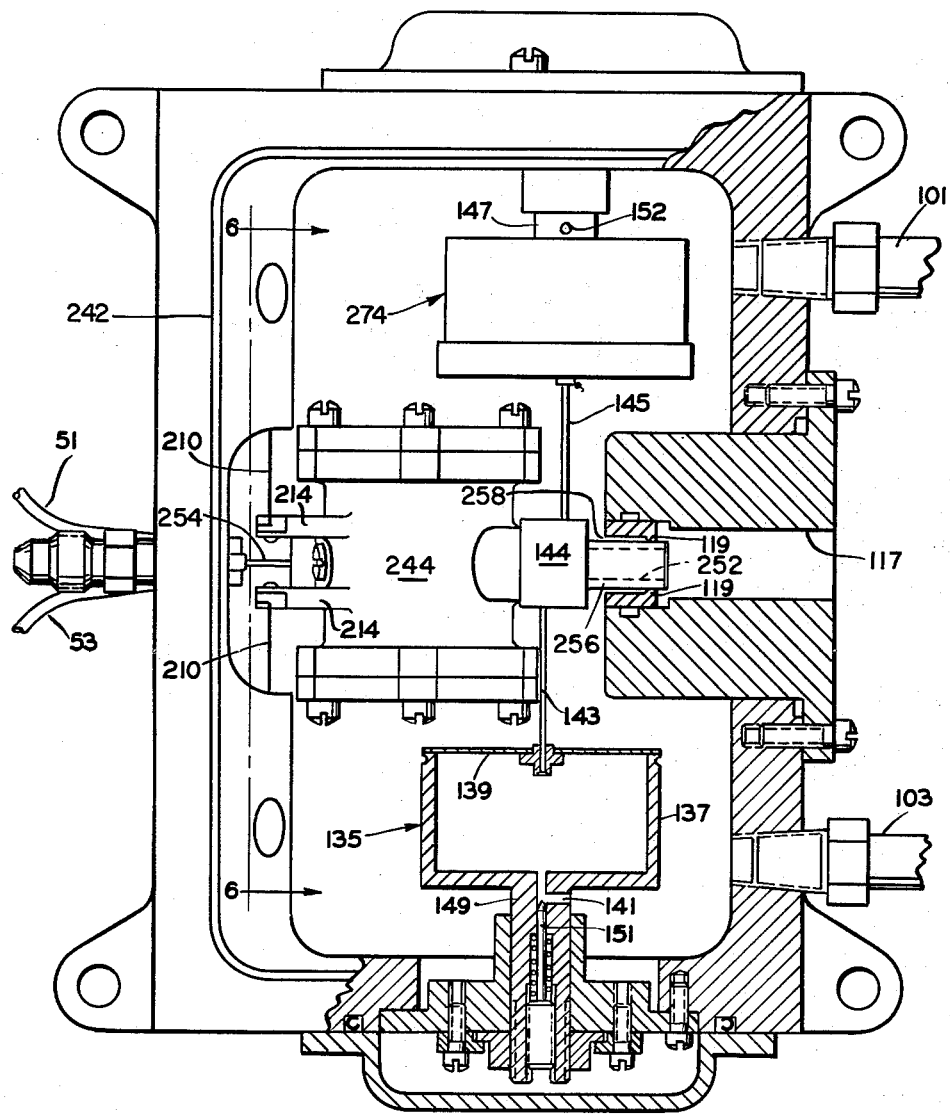
FIGURE 4 is a side sectional view of a second form of pressurized gas driven rate gyroscope embodying the subject matter of the invention.
Figure 5:
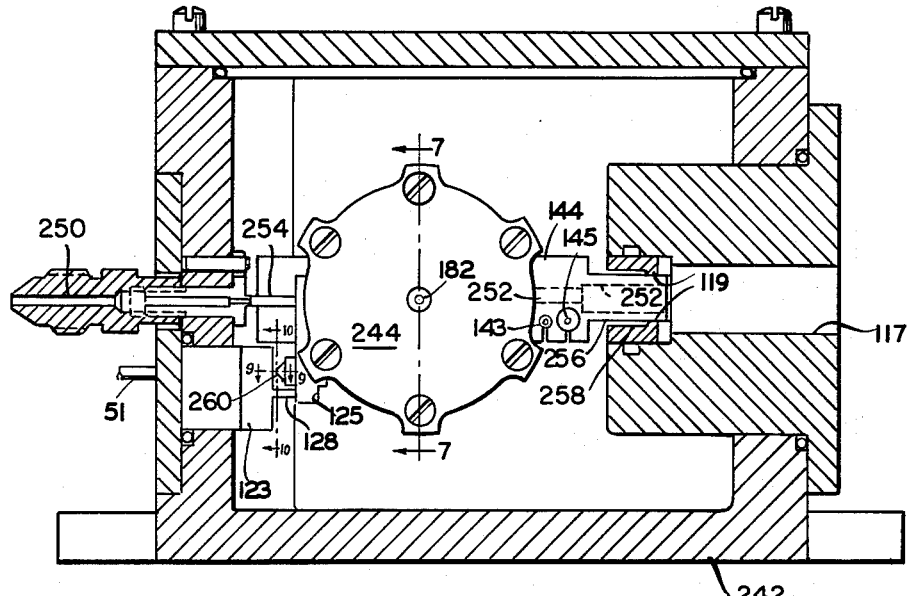
FIGURE 5 is a top sectional view of the rate gyroscope of FIGURE 4.

A second form of the gas pressure operated rate gyroscope 30 of FIGURE 1, is shown in FIGURES 4 and 5 in which corresponding parts are indicated by like numerals. In the second form of the rate gyroscope there may be provided a sealed casing 242, and pivotally mounted in the sealed casing 242 a rotor housing 244.

There is further provided, as shown in detail in FIGURES 7 and 8, a gas pressure driven turbine 106 having buckets 108 and rotatably mounted on gas bearings, as shown in FIGURE 7. The rotor housing 244, as shown in FIGURE 8, has an inlet passage 250 for a gaseous pressure medium and an outlet passage 252.

The inlet passage 250 opens into one end of a hollow flexible torsion tube 254, the other end of which opens into a passage 115 in the rotor housing 244, as shown in FIGURE 8. The torsion tube 254 acts as a spring in restraint of angular movement of the rotor housing 244 about the axis of tube 254 and a bearing member 256. The gaseous pressure medium may be supplied to the inlet passage 250 by the gas supply line 27, as shown diagrammatically by FIGURE 1. The outlet passage 252 may extend through the bearing member 256 and exhausts through a channel 117 to atmosphere, as shown in FIGURE 4. The bearing member 256 is mounted in a gas bearing 258 and has a restricted portion 119 which permits the pressurized gaseous medium within the interior of the casing 242 and applied to the gas bearing 258 to leak past such restricted portion and to in turn be exhausted to the atmosphere through the channel 117.

Angular motion of the rotor housing 244 about the axis of the tube 254 effects an angular adjustment of a jet pipe nozzle 260 shown in FIGURES 5, 8 and 9, and projecting from the rotor housing 244. The nozzle 260 may be thereby adjustably positioned relative to two (2) jet pipe receiver orifices 121 and 262, shown in FIGURES 9 and 10, opening from an opposite face surface of a control block 123 positioned in slightly spaced relation to the nozzle 260. The jet pipe nozzle 260 and receiver orifices 121 and 262 may be of a conventional type such as shown, for example by U.S. Patent No. 2,345,169, granted March 28, 1944 to G. Wunsch et al. and may be operably connected to suitable output signal conduits 51 and 53, shown in FIGURE 4 and indicated diagrammatically in FIGURE 1.

The jet pipe nozzle 260 may be mounted on an arm 125, as shown in FIGURES 5 and 8, projecting from the rotor housing 244. A passage 127 leads through the arm 125 to the nozzle 260 from the gaseous pressure inlet passage 250, as best shown in FIGURE 8. The arm 125 carries a pin 128 which projects into an oversized hole 270 in the control block 123, shown in FIGURE 10, and is so arranged as to engage an edge defining the oversized hole 270 in the control block 123 to limit movement of the arm 125 and thereby nozzle 260 relative to the two (2) jet pipe receiver orifices 121 and 262 within a predetermined operative range.

As shown in FIGURE 5, the jet pipe nozzle 260 is spaced slightly from the opposite face surface of the control block 123 so as to provide, for example, a .001 inch gap therebetween permitting that portion of the gaseous pressure medium from the jet pipe nozzle 260 which is not received in either orifice 121 or 262 to exhaust into the interior of the sealed casing 242 so as to provide a pressurizing gaseous medium therein.

Oscillatory motion of the rotor housing 244 about the torsion tube 254 and gas bearing 256–258 is damped by two (2) opposing diaphragm assemblies 274 and 135 of identical construction. The diaphragm assembly 135, as shown in detail in FIGURE 4, may include a cup shaped member 137 having an end thereof sealed by a flexible diaphragm 139 while the interior of the cup shaped member 137 opens through a restricted passage 141 to the pressurized gaseous medium within the sealed casing 242.

The diaphragm 139 is operatively connected through a flexible rod 143 to a flange 144 formed integral with the bearing member 256. The diaphragm assembly 274 is similarly constructed and is operatively connected through a flexible rod 145 to the flange 144 at the opposite side thereof.

The cup shaped member of the diaphragm assembly 274 is connected by a post 147 to the interior surface of the casing 242 while the cup shaped member 137 of the diaphragm assembly 135 is similarly connected by a post 149 to the interior surface of the casing 242 at the opposite side of the flange 144 from the diaphragm assembly 135. The passage 141, as shown in FIGURE 4, is restricted by an adjustable pin 151 projecting through the post 149 and screw threadably engaged therein, as shown in FIGURE 4. The diaphragm assembly 274 has a similar adjustable pin, not shown, for restricting a passage 152 in the post 147 connecting the interior of the cup shaped member of the diaphragm assembly 274 to the gaseous pressure medium within the sealed casing 242.

Undesirable oscillatory movements of the rotor housing 244 are damped by the action of the two (2) opposed diaphragm assemblies 274 and 135 acting between the flange 144 of the bearing 256 and the casing 242. This is accomplished by one of the diaphragms of the diaphragm assemblies 274 and 135, for example, diaphragm 139 pressing the volume of the gaseous medium in the interior of the cup shaped member 137 and exhaling it through the restricted passage 141 into the interior of the pressurized casing 242 while the diaphragm of the other assembly 274, for example, expands the volume of gas within the interior of the cup shaped member thereof and inhales additional fluid pressure medium through the restricted passage 152. Each of the diaphragms of the diaphragm assemblies 274 and 135 may alternately expand and compress the gaseous medium in the interior thereof in one complete cycle of operation to effectively damp undesirable oscillatory motions of the gimbal or rotor housing 244.

Further, as shown in FIGURE 8, passages 160 and 162 extend longitudinally in screws 164 and 166 angularly positioned in the rotor housing 244 at opposite sides thereof. The screws 164 and 166 are screw threadably engaged in the rotor housing 244 and the passages 160 and 162 extend from the outer ends of the screws 164 and 166 into the interior of the rotor housing 244 so that the pressurized gaseous medium within the interior of the sealed casing 247 is directed into the interior of the rotor housing 244 in impinging jet relation to the buckets 108 to impart rotary motion to the turbine 106 in a clockwise direction as viewed in FIGURE 8.

The pressurized gaseous medium thus directed through the passages 160 and 162 in impinging relation to the buckets 108 serve to drive the turbine 106 within the rotor housing 244. The jets of pressurized impinging gaseous medium are in turn exhausted into the cavities 170 and 172 within the rotor housing 244 at opposite sides of the turbine 106, as shown in FIGURE 8. The cavities 170 and 172 are in turn connected through annular passages or channels 174 in the rotor housing 244, as shown in FIGURE 7, so that the pressurized gaseous medium exhausted into the interconnected cavities 170 and 172 may in turn be exhausted through the exhaust passage 252 provided in bearing 256 and opening from the cavity 170, as shown in FIGURE 8, to the atmosphere through the exhaust channel 117 in the casing 242, as shown in FIGURES 4 and 5.

There are further provided in the rotor housing 244 at opposite ends thereof, as shown in FIGURE 7, inlet passages or ports 182 and 184 through which the pressurized gaseous medium within the sealed casing 242 may be directed into the interior of the rotor housing 244 and at the opposite ends of the rotor or turbine member 106. Further, opening through the side of the housing 244 are ports 186 and 187 which serve to direct pressurized gaseous medium from within the casing 242 into annular channels 190 and 192 which in turn open through ports 194 and 196 into the interior of the rotor housing 244 so as to apply a layer of pressurized gaseous medium about the bearing surfaces of the turbine 106. Such gaseous medium under pressure is applied both to the turbine 106 at the bearing end surfaces thereof as well as to the annular side bearing surfaces of the turbine 106.

The turbine 106 is effectively floated then in a gas bearing within the rotor housing 244 provided by the pressurized gaseous medium applied through the ports 182, 184, 186, and 187. The pressurized gaseous medium forming the gas bearings at the ends of the turbine 106 are further exhausted through passages 200 and 202 into the annular channels 174 heretofore described.

Likewise the gaseous medium forming the gas bearing about the annular bearing surfaces of the turbine 106 exhausts into the channels 174 which in turn interconnect the cavities 170 and 172 and thereby exhaust through the passage 252 and exhaust passage 117 to the atmosphere, as heretofore explained.

The bearing 256, as shown in FIGURES 4 and 5, also floats in pressurized gas bearing 258 supplied by gaseous medium under pressure from the interior of the casing 242 and exhausted past the restriction 119 into the channel 117 and thereby to the atmosphere.

Figure 6:
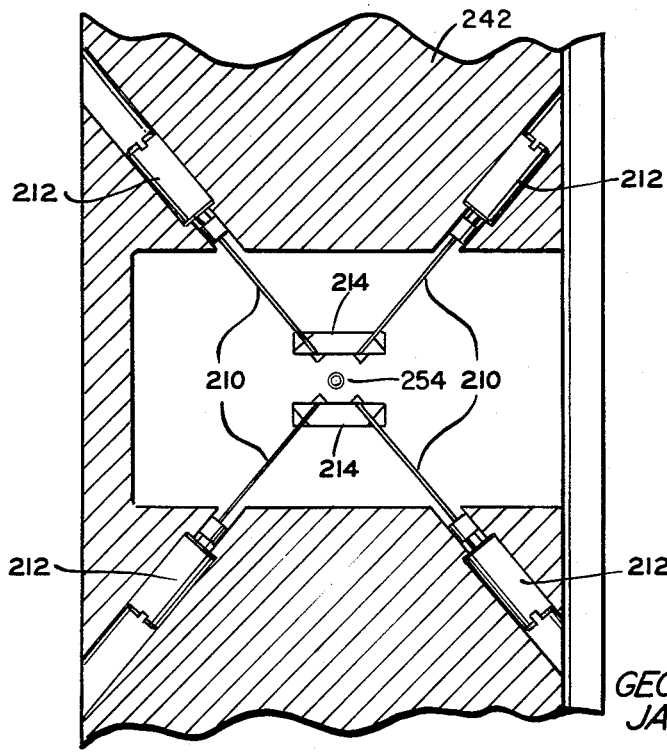
FIGURE 6 is a partial sectional view of FIGURE 4 taken along the lines 6—6 and looking in the direction of the arrows.

Thus the bearing 256 end of the rotor housing 244 floats in the pressurized gas bearing 258 while the opposite end of the rotor housing 244, as shown in FIGURES 4 and 6, is supported by flexible cross spring members 210 secured by fastening members 212 mounted in the casing 242 and secured at the opposite end to projecting flange portions 214 carried by the rotor housing 244, so that between the flexible torsion bar 254 and the cross spring member 210 the rotor housing 244 is flexibly supported at one end thereof while the other end of housing 244 is mounted in the gas bearing 258 and supported from undesirable oscillatory motions by the diaphragm bellows assemblies 274 and 135 which serve to dampen such undesirable oscillatory motions.

While several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a flight vehicle of a type including means for controlling an attitude of the vehicle, a rate gyroscope carried by said vehicle, and means operatively connecting the rate gyroscope to the attitude control means; the improvement comprising said connecting means including a source of pressurized gaseous medium, and said rate gyroscope including a first casing, a second casing, a signal generating means operatively positioned by angular movement of said second casing relative to said first casing of said rate gyroscope to direct a portion of the pressurized gaseous medium from said source to the attitude control means as a controlling signal therefor and to direct another portion of the pressurized gaseous medium from said source into said first casing, means for supporting said second casing within said first casing for said angular movement relative thereto, a rotor member mounted within said second casing, means for directing the pressurized gaseous medium from within said first casing into said second casing for rotatably driving said rotor member, and other means for exhausting the pressurized gaseous medium driving said rotor member from within said second casing and exteriorly of said first casing.

2. In a flight vehicle of a type including means for controlling an attitude of the vehicle, a rate gyroscope carried by said vehicle, and means operatively connecting the rate gyroscope to the attitude control means; the improvement comprising said connecting means including a source of pressurized gaseous medium, and said rate gyroscope including a first casing, a second casing, a signal generating means operatively positioned by angular movement of said second casing relative to said first casing of said rate gyroscope to direct a portion of the pressurized gaseous medium from said source to the attitude control means as a controlling signal therefor and to direct another portion of the pressurized gaseous medium from said source into said first casing, torsion spring means for resiliently supporting said second casing within said first casing so as to permit the angular movement of the second casing relative to the first casing, means operatively connected between the first casing and the second casing to dampen oscillatory motions of the second casing relative to the first casing, a rotor member mounted within said second casing, means for directing the pressurized gaseous medium from within said first casing into said second casing for rotatably driving said rotor member, and other means for exhausting the pressurized gaseous medium driving said rotor member from within said second casing and exteriorly of said first casing.

3. The combination defined by claim 2 in which said oscillatory damping means includes a pair of opposing bellows operatively connected between the first and second casings, each of said bellows having a restricted orifice opening the interior thereof to the pressurized gaseous medium within the first casing so that one of said pair of bellows may compress and exhale a gaseous medium therein through the restricted orifice into the first casing while alternately the other of said bellows may expand the interior volume of said other bellows so as to effectively inhale from within the first casing a gaseous medium through the restricted orifice thereof so as to dampen oscillatory motions of the second casing relative to the first casing.

4. The combination defined by claim 2 in which the oscillatory damping means includes a pair of opposing diaphragm asssembly means, each of said opposing diaphragm assembly means including a cup-shaped member, a flexible diaphragm sealing an end of said cup-shaped member, said cup-shaped member having a restricted passage opening from the interior of the cup-shaped member to the pressurized gaseous medium within the first casing, means operatively connecting the cup-shaped member to one of said casings, and other means operatively connecting the flexible diaphragm to the other of said casings so that oscillatory movements of the second casing relative to the first casing may be effectively damped by the action of the pair of opposing diaphragm assemblies.

5. In a flight vehicle of a type including means for controlling an attitude of the vehicle, a rate gyroscope carried by said vehicle, and means operatively connecting the rate gyroscope to the attitude control means; the improvement comprising said connecting means including a source of pressurized gaseous medium, and said rate gyroscope including a first casing, a second casing, a signal generating means operatively positioned by angular movement of said second casing relative to said first casing of said rate gyroscope to direct a portion of the pressurized gaseous medium from said source to the attitude control means as a controlling signal therefor and to direct another portion of the pressurized gaseous medium from said source into said first casing, a pair of resilient tubular members for supporting said second casing within said first casing for said angular movement relative thereto, a rotor member mounted within said second casing, port means in said second casing for directing pressurized gaseous medium from within said first casing into said second casing for rotatably driving said rotor member, one of said resilient tubular members supplying the pressurized gaseous medium from said source to said signal generating means, and the other of said resilient tubular members exhausting the pressurized gaseous medium driving said rotor member from said second casing and exteriorly of said first casing.

6. In a flight vehicle of a type including means for controlling an attitude of the vehicle, a rate gyroscope carried by said vehicle, and means operatively connecting the rate gyroscope to the attitude control means; the improvement comprising said connecting means including a source of pressurized gaseous medium, and said rate gyroscope including a first casing, a second casing, a signal generating means operatively positioned by angular movement of said second casing relative to said first casing of said rate gyroscope to direct a portion of the pressurized gaseous medium from said source to the attitude control means as a controlling signal therefor and to direct another portion of the pressurized gaseous medium from said source into said first casing, a torsion tube affixed to the first and second casings at opposite ends thereof to resiliently support said second casing at one side thereof and within said first casing for said angular movement relative thereto, a bearing member projecting from said second casing at an opposite side from said torsion tube, gaseous bearing means in said first casing supplied with pressurized gaseous medium from within said first casing and supporting said bearing member, a rotor member mounted within said second casing, means for directing pressurized gaseous medium from within said first casing into said second casing for rotatably driving said rotor member, and channel means for exhausting the pressurized gaseous medium driving said rotor member from within said second casing and opening through said bearing member exteriorly of said first casing.

7. In a flight vehicle of a type including means for controlling an attitude of the vehicle, a rate gyroscope carried by said vehicle, and means operatively connecting the rate gyroscope to the attitude control means; the improvement comprising said connecting means including a source of pressurized gaseous medium, and said rate gyroscope including a first casing, a second casing, a signal generating means operatively positioned by angular movement of said second casing relative to said first casing of said rate gyroscope to direct a portion of the pressurized gaseous medium from said source to the attitude control means as a controlling signal therefor and to direct another portion of the pressurized gaseous medium from said source into said first casing, a torsion tube affixed to the first and second casings at opposite ends thereof to resiliently support said second casing at one side thereof and within said first casing for said angular movement relative thereto, a bearing member projecting from said second casing at an opposite side from said torsion tube, gaseous bearing means in said first casing supplied with pressurized gaseous medium from within said first casing and supporting said bearing member, a rotor member mounted within said second casing, port means for directing pressurized gaseous medium from within said first casing into said second casing for rotatably driving said rotor member, gaseous bearing means in said second casing supplied with pressurized gaseous medium by said port means and rotatably supporting said rotor member within said second casing, channel means for exhausting the pressurized gaseous medium driving said rotor member and supplied to said gaseous bearing means within said second casing, and said channel means extending through said bearing member projecting from said second casing and into an opening in said first casing to the exterior thereof.

8. A gaseous pressure operated rate gyroscope comprising, in combination, a first casing, a second casing, means for supporting the second casing for angular adjustment within the first casing, a signal generating means including first port means supported by thefi rst casing and second port means supported by the second casing, said second port means being adjustably positioned relative to the first port means with the angular adjustment of the second casing relative to the first casing, means for supplying a pressurized gaseous medium to one of said port means, said one port means directing a first portion of the gaseous pressure medium to the other of said port means for effecting a control signal while directing a remaining second portion of the gaseous pressure medium to the interior of the first casing for pressurizing the interior of the first casing with the gaseous pressure medium, the first and second portions of the gaseous pressure medium varying with the angular adjustment of the second casing relative to the first casing, a turbine member mounted within said second casing, means for directing the pressurized gaseous medium from within said first casing into said second casing for rotatably driving said turbine member, and other means for exhausting the pressurized gaseous medium driving said turbine member from within said second casing and exteriorly of said first casing.

9. A gaseous pressure operated rate gyroscope comprising, in combination, a first casing, a second casing, means for supporting the second casing for angular adjustment within the first casing, a signal generating means including first port means supported by the first casing and second port means supported by the second casing, said second port means being adjustably positioned relative to the first port means with the angular adjustment of the second casing relative to the first casing, means for supplying a pressurized gaseous medium to one of said port means, said one port means directing a first portion of the gaseous pressure medium to the other of said port means for effecting a control signal while directing a remaining second portion of the gaseous pressure medium to the interior of the first casing for pressurizing the interior of the first casing with the gaseous pressure medium, the first and second portions of the gaseous pressure medium varying with the angular adjustment of the second casing relative to the first casing, a turbine member mounted within said second casing, third port means for directing the pressurized gaseous medium from within said first casing into said second casing for rotatably driving said turbine member, gaseous bearing means in said second casing supplied with pressurized gaseous medium by said third port means and rotatably supporting said turbine member within said second casing, and channel means for exhausting the pressurized gaseous medium driving said turbine member and supplied to said gaseous bearing means within said second casing to the exterior of said first casing.

10. The combination defined by claim 9 in which said means for supporting the second casing for angular adjustment within the first casing includes a pair of tubular members projecting from opposite sides of the second casing to the first casing, at least one of the tubular members being a torsion tube secured between said first and second casings for resiliently supporting the second casing so as to permit said angular adjustment within the first casing, and the other of said tubular members being a bearing tube operably connected to said one port means for supplying the pressurized gaseous medium to said one port means of the signal generating means, and said channel means including the other of said tubular members for exhausting the pressurized gaseous medium driving said turbine member and supplied to said gaseous bearing means within said second casing to the exterior of said first casing.

11. The combination defined by claim 10 including damping means operatively connected between the first and second casings, said damping means including a pair of opposing diaphragm assembly means to alternatively exhale and inhale a gaseous medium to and from the pressurized gaseous medium within the first casing so as to dampen oscillatory motion of the second casing relative to the first casing.

12. The combination defined by claim 9 in which said means for supporting the second casing for angular adjustment within the first casing includes a torsion tube element affixed to the first and second casings at opposite ends thereof to resiliently support said second casing at one side thereof and within said first casing for said angular movement relative thereto, a tubular bearing element projecting from said second casing at an opposite side from said torsion tube, gaseous bearing means in said first casing supplied with pressurized gaseous medium from within said first casing and supporting said bearing element, one of said elements connected to said one port means and operable for supplying the pressurized gaseous medium to said one port means of the signal generating means, and said channel means including the other of said elements for exhausting the pressurized gaseous medium driving said turbine member and supplied to said gaseous bearing means within said second casing to the exterior of said first casing.

13. The combination defined by claim 12 including damping means operatively connected between the first and second casings, said damping means including a pair of opposing diaphragm assembly means to alternately exhale and inhale a gaseous medium to and from the pressurized gaseous medium within the first casing so as to dampen oscillatory motion of the second casing relative to the first casing.

References Cited by the Examiner

UNITED STATES PATENTS

| | | | |
|---|---|---|---|
| 2,345,169 | 3/1944 | Wunsch et al. | 74—5.6 |
| 2,794,345 | 6/1957 | Conway | 74—5.6 |
| 2,821,859 | 2/1958 | Crockett | 74—5.6 |
| 2,852,942 | 9/1958 | Gerard | 74—5.6 |

BROUGHTON G. DURHAM, *Primary Examiner.*

T. W. SHEAR, *Assistant Examiner.*